United States Patent

[11] 3,569,812

| [72] | Inventors | Trevor Bates<br>Dunstable;<br>Francis Stanley Griffin, Leighton Buzzard, England |
|---|---|---|
| [21] | Appl. No. | 778,663 |
| [22] | Filed | Nov. 25, 1968 |
| [45] | Patented | Mar. 9, 1971 |
| [73] | Assignee | General Motors Corporation<br>Detroit, Mich. |
| [32] | Priority | Nov. 30, 1969 |
| [33] | | Great Britain |
| [31] | | 54,491/67 |

[54] ELECTRIC WINDSCREEN WIPER SYSTEMS
2 Claims, 1 Drawing Fig.

[52] U.S. Cl. .................................................. 318/443, 15/250.12
[51] Int. Cl. ................................................... B60s 1/08
[50] Field of Search ........................................... 318/443, 444; 307/132; 15/250.12

[56] References Cited
UNITED STATES PATENTS

| 3,262,042 | 7/1966 | Amos .......................... | 318/443 |
| 3,339,123 | 8/1967 | Riester ........................ | 318/443 |
| 3,407,345 | 10/1968 | Fruehauf et al. ............... | 318/443 |
| 3,452,248 | 6/1969 | Leeder, Jr. ................... | 307/132(E) |

FOREIGN PATENTS

| 1,085,797 | 10/1967 | Great Britain ................. | 318/443 |

*Primary Examiner*—Oris L. Rader
*Assistant Examiner*—Robert J. Hickey
*Attorneys*—E. W. Christen and R. G. Stahr

ABSTRACT: In an electric windscreen wiper system, pulsed operation of the wipers is obtainable by means of a circuit, in which the electric wiper motor is intermittently connectable to an electric power source by a relaxation oscillator circuit which includes a unijunction transistor.

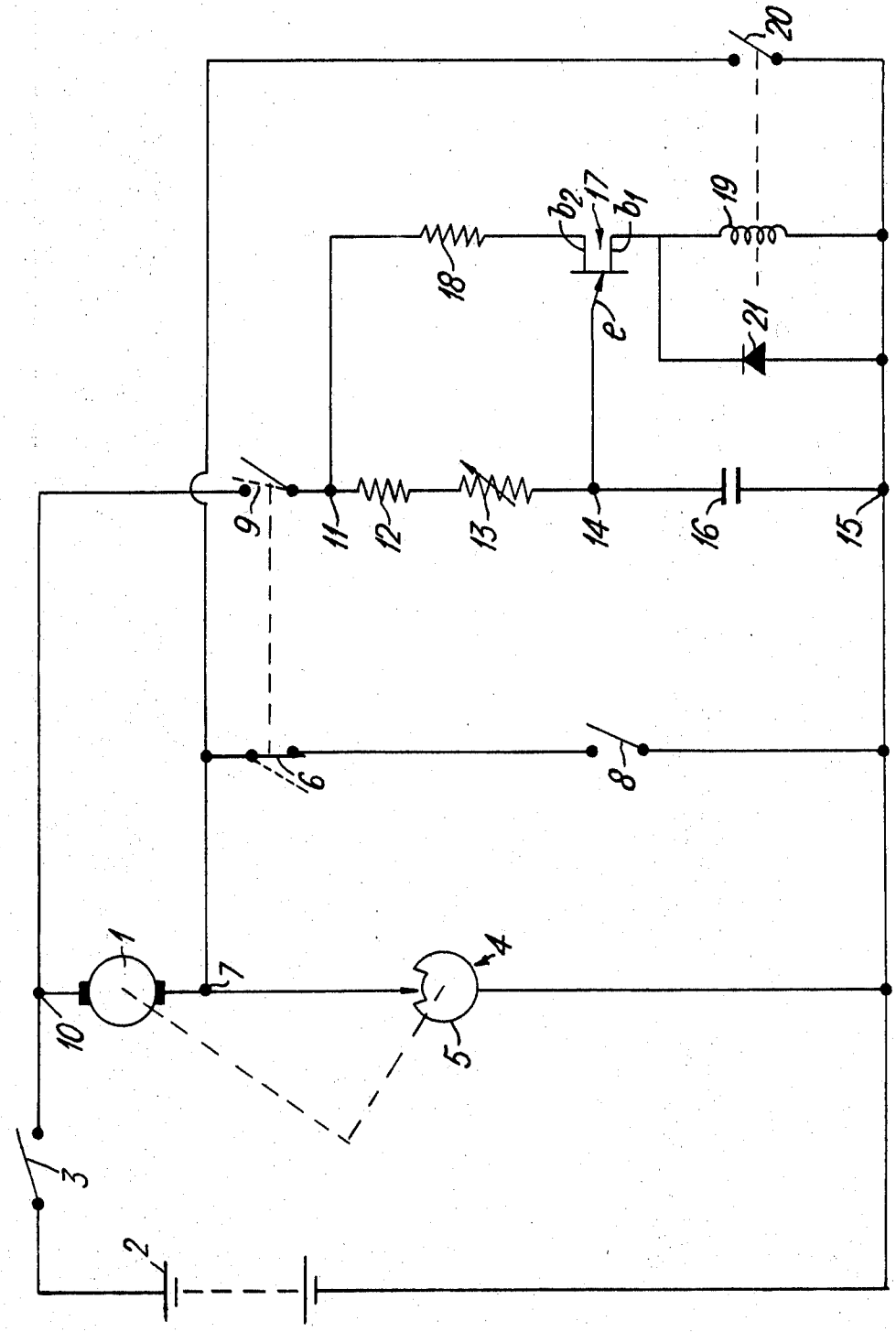
Inventors
Trevor Bates &
Francis Stanley Griffin
BY Richard G. Stahr Attorney

ELECTRIC WINDSCREEN WIPER SYSTEMS

This invention relates to windscreen wiper systems for motor vehicles and in particular to an electric windscreen wiper system which can be operated either continuously or intermittently.

In an electric windscreen wiper system according to the invention an electric motor for operatin operating the wipers is controllable by a relaxation oscillator circuit, including a unijunction transistor, by which the wiper motor is intermittently energized from a direct current source.

An electric windscreen wiper system according to the invention is diagrammatically shown in the accompanying drawing in which one side of an electric windscreen wiper motor 1 is shown connected to the positive side of a battery 2 through the intermediary of a switch 3, (the ignition switch of the vehicle in which the system is installed) the other side of the motor being connected to the negative side of the battery through a parking switch 4 the movable contact 5 of which is rotated in synchronism with the motor 1 and is arranged so that when the switch 8 is opened the motor 1 does not come to rest until the windscreen wiper blades are in a predetermined parked position on the windscreen.

The movable contact of a switch 6 is connected to a junction 7 between the motor 1 and the parking switch 4, the fixed contact of the switch 6 being connected to the fixed contact of a further switch 8 (the windscreen wiper control switch) the movable contact of which is connected to the negative side of the battery.

The fixed contact of a further switch 9 is connected to a junction 10 between the switch 3 and the motor 1, the movable contact of the switch 9 being connected to a junction 11.

The switches 6 and 9 are arranged for joint operation so that when one switch is closed the other is open.

A fixed resistor 12 and a variable resistor 13 are connected in series betwen the junction 11 and a junction 14 between which and a junction 15 with a lead connected to the negative side of the battery there is interposed a capacitor 16.

A unif unijunction transistor 17 has its emitter $e$ connected to the junction 14 and one base electrode $b2$ connected to one end of a resistor 18 the other end of which is connected to the junction 11. The other base electrode $b1$ of the transistor is connected to one end of the coil 19 of a relay switch 20 the other end of the coil 19 being connected to the negative side of the battery.

A diode 21 is connected between the base $b1$ of the transistor 17 and the negative side of the battery in parallel with the relay coil 19.

The contacts of the relay switch 20 are connected between the junction 7 and the negative side of the battery.

OPERATION

For continuous operation of the windscreen wipers the switches 3 and 8 will be closed and the switches 6 and 9 will be in the full line position shown in the drawing, switch 6 being closed and switch 9 open. The motor 1 is connected with the battery and operates continuously, the switch 9 being open and thereby preventing the operation of the circuit including the transistor 17.

When it is desired to operate the windscreen wiper intermittently, with a predetermined interval between successive cycles of operation of the wipers the switches 6 and 9 are moved to the position shown in the drawing in dotted lines, switch 6 being opened and switch 9 being closed. The full supply voltage now appears across the junctions 11 and 15 and capacitor 16 is charged up by way of the resistor 12 and the variable resistor 13 during a period of time dependent upon the values of the resistors 12 and 13 and the capacitor 16.

The unijunction transistor 17 will conduct when the voltage across the capacitor 16 overcomes the peak point voltage $Vp$, where $Vp \simeq h\ Vb2b1$, where $h$ intrinsic standoff ratio, and $Vb2b1$ is the voltage between the base $b1$ and the base $b2$ of the transistor 17.

With the transistor 17 conductive, current passes through the relay coil 19 closing the contacts of the relay 20 and energising the windscreen wiper motor 1. Before the motor has completed one cycle of operation the transistor 17 switches off, due to the discharging of the capacitor 16 into the relay winding, as the result of which the capacitor voltage drops below the intrinsic standoff ratio requirements for conduction in the transistor 17. The relay coil 19 is therefore deenergised and the contacts 20 of the relay open, but the windscreen wiper motor will continue to run until the movable contact 5 of the parking switch 4 opens the circuit to stop the motor 1. The diode 21 connected across the relay coil 19 prevents any damage to the unijunction transistor 17 from the back E.M.F. induced across coil 19 during switching of the transistor. The motor then remains inoperative for a period predetermined by the value to which the variable resistor 13 is set, the cycle of operation then being repeated so long as the switches 6, 9 remain in their dotted line positions.

It will be understood that by appropriate adjustment the circuit can be arranged to operate the motor 1 to give a predetermined number of cycles of operation of the wiper between the periods during which the motor is inoperative.

The relay coil 19 could be replaced by a resistor and a pulsating voltage extracted from across this resistor to trigger an amplifier which would then operate the relay contacts 20.

The system described has the advantage that the voltage for the circuit which determines the ine interval between successive cycles of operation during intermittent operation of the wiper is obtained direct from the battery, instead of from across the wiper parking switch, thereby ensuring that there are no "spikes" or voltage transients present which might unfavourably influence the circuit.

The unijunction transistor is also unaffected by supply voltage fluctuations, so that supply voltage stabilisation is unnecessary. The circuit described may be used with either negative or por positive earth systems.

We claim:

1. A vehicle windshield wiper system comprising in combination with a direct current electric motor for operating the wipers and a source of direct current operating potential, a variable resistor, a capacitor, an electric switch having first and second pairs of contacts arranged in such a manner that when one pair of contacts is open the other pair of contacts is closed, means for connecting said electric motor and said first pair of contacts in series across said source of direct current operating potential, means for connecting said second pair of contacts, said variable resistor and said capacitor in series across said source of direct current operating potential, a unijunction transistor having two base electrodes and a control electrode, an electric relay having an operating coil and a pair of normally open contacts, means for connecting said second pair of contacts of said electric switch, said base electrodes of said unijunction transistor and said operating coil of said relay in series across said source of direct current operating potential, means for connecting said control electrode of said unijunction transistor to the junction between said series connected resistor and capacitor, and means for connecting said electric motor and said normally open contacts of said electric relay in series across said source of direct current operating potential.

2. A vehicle windshild wiper system comprising in combination with a direct current electric motor for operating the wipers and a source of direct current operating potential, a parking switch having a movable contact operated in synchronism with said electric motor to an open position when said wipers are in a predetermined park position, means for connecting said parking switch in series with said electric motor across said source of direct current operating potential, a variable resistor, a capacitor, an electric switch having first and second pairs of contacts arranged in such a manner that when one pair of contacts is open the other pair of contacts is closed, means for connecting said first pair of contacts in parallel with said parking switch, means for connecting said second pair of contacts, said variable resistor and said capacitor in series across said source of direct current operating potential, a unijunction transistor having two base electrodes and a control electrode, an electric relay having an operating coil and a pair of normally open contacts, means for connecting said pair of contacts of said electric switch, said base electrodes of said unijunction transistor and said operating coil of said relay in series across said source of direct current operating potential means for connecting said control electrode of said unijunction transistor to the junction between said series connected resistor and capacitor, and means for connecting said electric motor and said normally open contacts of said electric relay in series across said source of direct current operating potential.

PO-1050
(5/69)

UNITED STATES PATENT OFFICE
CERTIFICATE OF CORRECTION

Patent No. 3,569,812          Dated March 9, 1971

Inventor(s) Trevor Bates and Francis Stanley Griffin

It is certified that error appears in the above-identified patent and that said Letters Patent are hereby corrected as shown below:

Column 1, line 6, delete "operatin". Column 2, line 28 delete "ine"; line 37, delete "por"; line 63, "windshild" should read -- windshield --. Column 3, line 6, insert -- second -- before "pair".

Signed and sealed this 13th day of July 1971.

(SEAL)
Attest:

EDWARD M. FLETCHER, JR.          WILLIAM E. SCHUYLER, JR.
Attesting Officer          Commissioner of Patents